United States Patent Office.

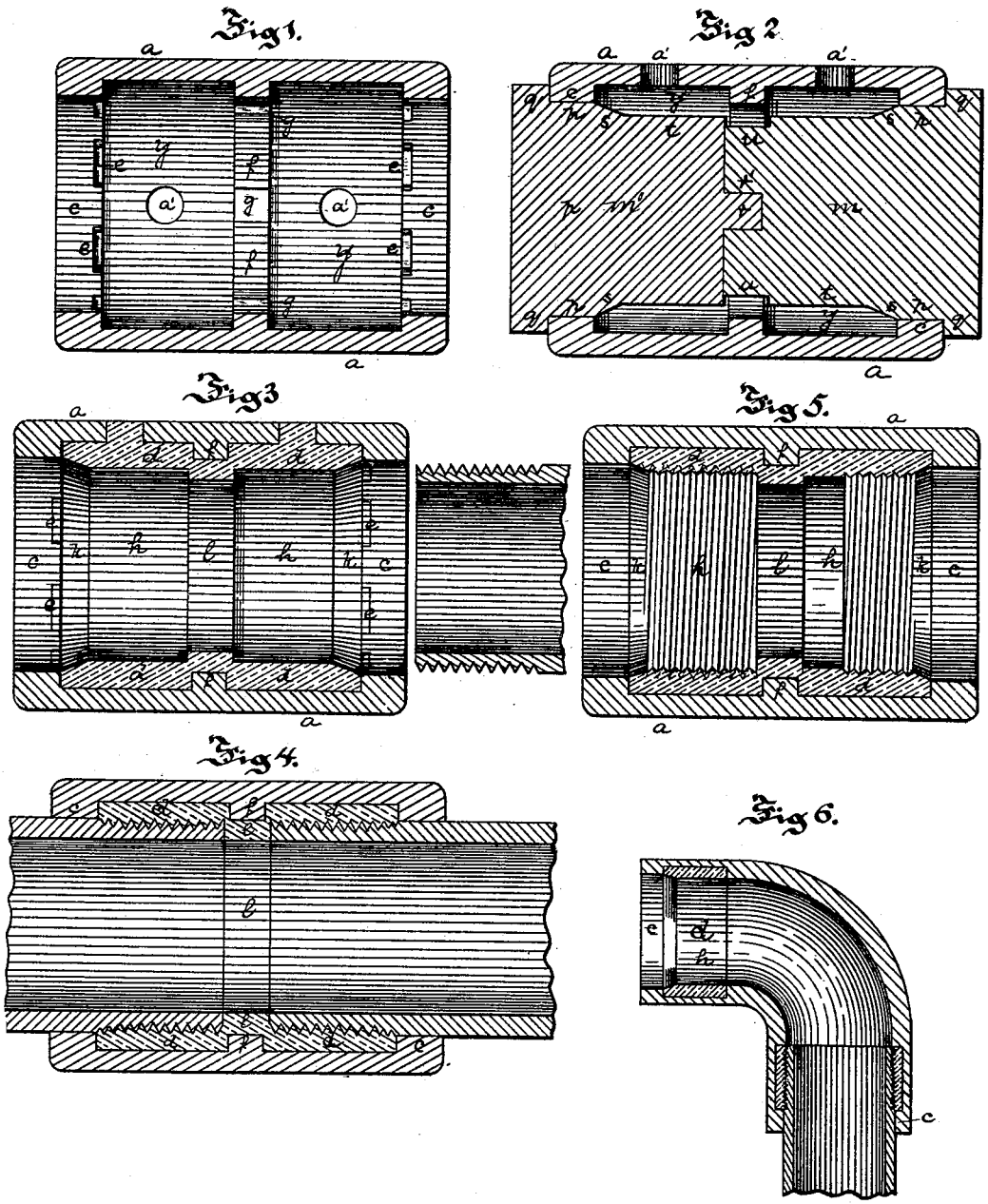

ABRAM REESE, OF PITTSBURG, PENNSYLVANIA.

TUBE-COUPLING.

SPECIFICATION forming part of Letters Patent No. 360,172, dated March 29, 1887.

Application filed September 19, 1884. Serial No. 143,461. (No model.)

*To all whom it may concern:*

Be it known that I, ABRAM REESE, of Pittsburg, in the county of Allegheny and State of Pennsylvania, have invented a new and useful Improvement in Tube-Couplings; and I do hereby declare the following to be a full, clear, and exact description thereof.

My invention relates to couplings for tubing, its object being to form a coupling for wrought-metal tubing which will form a tight joint for water, gas, steam, or other fluids, and which may be employed in the same manner as the ordinary threaded coupling-socket. Its special object is to provide a tight joint for natural gas, this gas being obtained through Artesian wells and being employed largely in manufactories and houses for heating purposes, but being exceedingly thin and subtile, so that it will leak rapidly through the ordinary threaded coupling, and when mixed with a large portion of air being highly explosive, so that tight joints for the tubing in which it is conducted are absolutely necessary.

My invention consists, essentially, in a coupling for threaded tubing formed of a socket having a soft-metal lining therein, extending from the center toward the ends, said lining being adapted to receive the threaded ends of the tubing, the tubing being screwed into said socket and cutting corresponding threads into said soft-metal lining, and thus embedding itself in the soft-metal lining and making a perfectly-tight joint.

It also consists in providing the soft-metal lining with an annular central ring, against which the ends of the tubing fit or bear, the end faces of the tubing being embedded in this ring, and the ring also forming a smooth interior to the line of tubing within the joint.

It also consists in providing the socket with annular supporting-rings beyond the soft-metal lining, to fit around the body of the tubing and support it against transverse strains.

It also consists in other improvements in the coupling.

To enable others skilled in the art to make and use my invention, I will describe the same more fully, referring to the accompanying drawings, in which—

Figure 1 is a longitudinal section of the socket before lining. Fig. 2 is a like view showing the plug or core employed in securing the lining within the socket. Fig. 3 is a like view of the socket lined ready for use. Fig. 4 is a like view showing the tubing screwed into the coupling. Fig. 5 shows the coupling where a partial or guiding thread is cut in the soft metal. Fig. 6 is a like view of an elbow, illustrating my invention.

Like letters of reference indicate like parts in each.

The socket $a$ of the coupling is preferably cast to shape, and is made of iron, steel, or other suitable material of sufficient strength. It is provided with the annular depression $y$, to receive the lining $d$, of lead or other suitable soft metal, and at the ends of the socket are the annular rings $c$, corresponding in diameter to that of the tubing to be coupled, to support the tubing against side or transverse strains.

To prevent the soft-metal lining $d$ from turning within the socket, the inner edges of the rings $c$ are provided with a series of depressions or recesses, $e$, into which the lead lining fits. Where the soft-metal lining occupies a large portion of the inner surface of the coupling, the socket is preferably provided with an inner central ring, $f$, to strengthen it, and the face of this ring $f$ has a series of depressions or recesses, $g$, within which the lead lining prevents its turning as the tubing is screwed to place. The lead lining $d$ extends from the center of the socket toward the ends, so that as the tubing is screwed into it the ends of the tubing are surrounded by and embedded in the soft metal, and the interior diameter of the body $h$ of the lining is slightly less than the diameter of the tubing to be connected at the base of the screw-threads, the lining gradually increasing in diameter at the ends, as at $k$, to the full diameter of the annular rings $c$, so that when the pipe enters the coupling it will be directed by the sloping or beveled face $k$ into the body of the lining, and will then, on turning the pipe, cut its own thread in the soft-metal lining. The lining, being compressed between the socket and pipe, is forced into the screw-threads and packed tightly therein, forming a perfectly-tight joint. The lining $d$ is also provided with the annular central ring, $l$, against which soft-metal ring the ends of the pipes fit when screwed to place, and in which the end faces of the pipes are embedded, thus further insuring a tight joint. The inner face of the ring $l$ corresponds in diameter to the interior of the tubing, thus forming a smooth interior within the line of tubing at the joint and preventing the formation of whirling or side currents, and so reducing the friction of the gas or other fluid passing through.

The soft-metal lining is preferably cast within the socket, the portable plug or core $m$ $m'$ fitting within the socket and forming a mold or cavity for the reception of the soft metal. The plug has the annular faces $p$, fitting within the annular rings $c$ of the socket, and annular shoulders $q$, fitting against the ends of the socket, the parts of the plug meeting within the socket, and being centered therein by the steady-pin $r$ in one part fitting within a seat, $r'$, in the other. The outer faces of the plug correspond to the inner walls or face of the lead lining, forming a mold therefor, the tapering faces $s$ forming the sloping faces $k$, and the straight faces $t$ the body $h$, while the annular depression $u$ at the end of the part $m$ forms the annular ring $l$.

The molten soft metal enters the cavity through the pouring-holes $a'$, and when it is set the plug is withdrawn and the coupling is ready for use.

The coupling is used in the same manner as an ordinary threaded socket, the tubing being screwed into it, and the threads of the tubing cutting corresponding threads in the soft-metal lining, thus compressing the soft metal between the tubing and the socket, and causing it to fill and be packed tightly within the threads of the tubing, thus forming an absolute tight joint. As the end faces of the tubing are forced against the central ring, $l$, they embed themselves against it, and thus further insure a tight joint. The joint so formed has been tested at a pressure of one thousand eight hundred pounds to the square inch without leakage. The body of the tubing is supported against transverse strains by the annular rings $c$ at the ends of the socket, which also prevent any severe strain on the lead lining.

If desired, a shallow thread may be formed in the lead lining, to act as a guide for the thread of the tubing, as shown in Fig. 5, this thread extending over part or all of the lining, and as the tubing is screwed in it cuts the thread deeper, as indicated by dotted lines, and so forms a tight joint.

My improved coupling may also be employed with valves, unions, elbows, T-joints, &c., the manner of its use with these joints being illustrated in the elbow shown in Fig. 6.

One of the advantages of my improvement is, that a tight joint is formed where the thread on the pipe is tapering, which cannot always be secured where the thread is formed in the hard metal of the socket.

What I claim as my invention, and desire to secure by Letters Patent, is—

1. As a coupling for threaded tubing, a sleeve having a soft-metal lining therein, forming a thread-receiving socket for the threaded ends of the tubing, substantially as and for the purpose specified.

2. As a coupling for threaded tubing, an unthreaded sleeve recessed internally, so as to form an inwardly-projecting flange at each end, with a soft-metal lining extending between the two end flanges, and having a central inwardly-projecting flange, substantially as described.

3. In couplings for threaded tubing, a socket having a soft-metal lining extending from the center toward the ends, said socket having annular supporting-rings beyond the soft-metal lining, substantially as and for the purposes set forth.

4. In couplings for threaded tubing, the socket $a$, having annular rings $c$ at the ends, the inner edges of said rings being recessed, in combination with the soft-metal lining $d$, fitting into said recesses, substantially as and for the purposes set forth.

5. In couplings for threaded tubing, the socket $a$, having the annular rings $c$, provided with recesses $e$ in the inner edges, and the central ring, $f$, having recesses $g$ in its face, in combination with the soft-metal lining $d$, fitting into said recesses, substantially as and for the purposes set forth.

6. In couplings for threaded tubing, the sleeve $a$, having the annular rings $c$ at the ends, and the soft-metal lining $d$, situate between the rings $c$, and having the beveled faces $k$ adjacent to the rings $c$, and a thread-receiving face, substantially as and for the purposes set forth.

7. In couplings for threaded tubing, a socket provided with a soft-metal lining extending from the center toward the ends, said lining having a shallow guiding-thread cut on its surface, substantially as and for the purposes set forth.

In testimony whereof I, the said ABRAM REESE, have hereunto set my hand.

ABRAM REESE.

Witnesses:
JAMES I. KAY,
J. N. COOKE.